US008156129B2

(12) United States Patent
Zhou et al.

(10) Patent No.: US 8,156,129 B2
(45) Date of Patent: Apr. 10, 2012

(54) SUBSTANTIALLY SIMILAR QUERIES

(75) Inventors: Dengyong Zhou, Redmond, WA (US);
Christopher J. C. Burges, Bellevue, WA (US); Robert L. Rounthwaite, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 486 days.

(21) Appl. No.: 12/353,976

(22) Filed: Jan. 15, 2009

(65) Prior Publication Data
US 2010/0185649 A1 Jul. 22, 2010

(51) Int. Cl.
G06F 17/30 (2006.01)
(52) U.S. Cl. ......... 707/749; 707/721; 707/723; 707/751
(58) Field of Classification Search .................. 707/721, 707/723, 727, 748, 749
See application file for complete search history.

(56) References Cited

U.S. PATENT DOCUMENTS

| | | | |
|---|---|---|---|
| 5,983,237 A | 11/1999 | Jain et al. | |
| 6,480,843 B2 | 11/2002 | Li | |
| 7,689,452 B2 * | 3/2010 | Lam et al. .................... | 705/7.33 |
| 2002/0111792 A1 | 8/2002 | Cherny | |
| 2004/0249808 A1 | 12/2004 | Azzam et al. | |
| 2005/0120016 A1 | 6/2005 | Midgley | |
| 2006/0041537 A1 | 2/2006 | Ahmed | |
| 2006/0122998 A1* | 6/2006 | Bar-Yossef et al. ............... | 707/5 |
| 2006/0179074 A1 | 8/2006 | Martin et al. | |
| 2006/0190225 A1* | 8/2006 | Brand ............................... | 703/2 |
| 2006/0248068 A1* | 11/2006 | Chien et al. ....................... | 707/4 |
| 2007/0203789 A1* | 8/2007 | Jain et al. ......................... | 705/14 |
| 2008/0082481 A1* | 4/2008 | Joshi et al. ........................ | 707/2 |
| 2008/0183685 A1* | 7/2008 | He et al. ............................ | 707/4 |
| 2008/0256061 A1* | 10/2008 | Chang et al. ...................... | 707/5 |
| 2009/0006290 A1* | 1/2009 | Gunawardana et al. ......... | 706/14 |
| 2009/0164456 A1* | 6/2009 | Slaney et al. ...................... | 707/5 |
| 2010/0125572 A1* | 5/2010 | Poblete et al. ................. | 707/722 |
| 2010/0161643 A1* | 6/2010 | Gionis et al. .................. | 707/765 |

OTHER PUBLICATIONS

Query-URL Bipartite Based approach to Personalized Query Recommendation by Lin Li, Zhenglu Yang, Ling Liu and Masaru Kitsuregawa, published 2008.*
Random Walks on the Click Graph by Nick Craswell and Martin Szummer, published Jul. 23-27, 2007.*
Davison, et al., "Finding Relevant Website Queries", Retrieved at <<http://www2003.org/cdrom/papers/poster/p308/ p308-davison.html>>, Nov. 18, 2008, pp. 3.
Zaiane, et al., "Finding Similar Queries to Satisfy Searches based on Query Traces", Retrieved at <<http://citeseerx.ist.psu.edu/viewdoc/download;jsessionid=A52A0A103E61298544F2A301305AF136?doi=10.1.1.8.9934&rep=rep1&type=pdf>>, pp. 11.
Cucerzan, et al., "Extracting Semantically Related Queries by Exploiting User Session Information", Retrieved at <<http://research.microsoft.com/users/silviu/Papers/np-www06.pdf>>, pp. 1-11.
Zhou, et al., "Query Suggestion Using Hitting Time", CIKM 2008: pp. 469-478.

* cited by examiner

*Primary Examiner* — Rehana Perveen
*Assistant Examiner* — Tiffany Thuy Bui

(57) ABSTRACT

A system described herein includes analyzer component that analyzes queries submitted by users and corresponding URLs selected by the users, wherein the queries include a first query and a second query, and wherein the analyzer component determines that the first query and the second query are substantially similar queries. The system additionally includes a correlator component that, responsive to the analyzer component determining that the first query and the second query are substantially similar, generates correlation data that indicates that the first and second queries are substantially similar.

20 Claims, 11 Drawing Sheets

SUBSTANTIALLY SIMILAR QUERIES

BACKGROUND

An amount of information available by way of the World Wide Web has grown exponentially, such that billions of items are available by way of the World Wide Web. Such explosive growth of web information has not only created a crucial challenge for search engine companies in connection with handling large scale data, but has also increased the difficulty for a user to manage his/her information needs. For instance, it may be difficult for a user to compose a succinct and precise query to represent his/her information needs.

Instead of pushing the burden of generating succinct search queries to the user, search engines have been configured to provide increasingly relevant search results. More particularly, a search engine can be configured to retrieve documents relevant to a user query by comparing attributes of documents together with other features such as anchor text, and can return documents that best match the query. Today's search engines can also consider previous user searches, user location, current events, amongst other information in connection with providing the most relevant search results to a user query. The user is typically shown a ranked list of universal resource locators (URLs) in response to providing a query to the search engine.

Moreover, at least some search engines are configured with functionality to provide a user with alternative queries to a query provided by the user. Such alternative queries can be configured to correct possible spelling mistakes, may be configured to provide the user with information that is related but non-identical to information retrieved by way of the query provided by the user, etc. For instance, if a user types a query "msg" to a search engine, the user may be provided with quite a few alternative potential queries such as "Madison Square Garden," "Monosodium Glutamate," and others. While such alternative queries may be useful, they are often designed to provide information to the user that is related to the query but not precisely directed to information that the user wishes to find.

SUMMARY

The following is a brief summary of subject matter that is described in greater detail herein. This summary is not intended to be limiting as to the scope of the claims.

Various technologies pertaining to determining whether queries are substantially similar to one another are described in detail herein. For instance, the queries "auto insurance," "automobile insurance," and "car insurance" may be substantially similar queries as they are designed to retrieve substantially similar information. In another example, the queries "pc" and "personal computer" may be substantially similar queries, and again, they may be directed to retrieve substantially similar information.

In connection with determining whether two or more queries are substantially similar queries, a bipartite graph can be constructed. For instance, the bipartite graph can be constructed from information in query logs pertaining to a search engine. The bipartite graph can include two sets of nodes: 1) first set of nodes that represents queries submitted to the search engine; and 2) a second set of nodes that represent URLs clicked by users when the queries were submitted. The bipartite graph can additionally include edges between nodes in the first set of nodes and nodes in the second set of nodes, wherein the edges indicate which URLs were selected by users given particular queries. Moreover, edges in the bipartite graph can be weighted based at least in part upon a number of selections of URLs given particular queries. Thus, for instance, if a particular query was submitted one hundred times by various users and a certain URL was selected by ninety of those users upon submitting the query, an edge between the query and the URL would be weighted in accordance with the number of selections of the URL given the particular query. In another example, a weight between a particular query and a certain URL can be a number of users who selected the URL divided by a number of times that this query was submitted by various users. This weight can be referred to herein as normalized weight. Since an irrelevant URL may be by accidentally chosen by a user, the bipartite graph can be pruned by removing an edge between a query and a URL if the weight (normalized or otherwise) on the edge is below a threshold. It can be ascertained that nodes that represent queries are not directly coupled by edges. Similarly, nodes that represent URLs are not directly connected with one another by edges. In other words, edges only couple nodes that represent queries with nodes that represent URLs.

To determine whether a first query is substantially similar to a second query, a random walk can be initiated at a first node in the bipartite graph, wherein the first node represents the first query. Weights of edges can be taken into account during the random walk such that a probability of an edge being selected during the random walk can correspond to a weight assigned to the edge. Again, the random walk can initiate at the first node and can continue to a node that represents a URL that is coupled to the first node. Then the random walk can continue from the node that represents the URL to a node that represents another query. In an example, the random walk can continue until a node that represents the second query is reached. A number of steps (e.g., where a step is from a node that represents a query to a node that represents a URL to a node that represents a query) can be indicative of whether or not the first query and the second query are substantially similar. If the number of steps taken during the random walk from the first node that represents the first query to the second node that represents the second query is below a threshold number of steps, the first query and the second query can be deemed as substantially similar queries. This mechanism for determining whether two queries are substantially similar can be referred to as hitting time. Other mechanisms including meeting time and commute time can also be used to determine whether two queries are substantially similar queries and will be described in greater detail herein.

If it is determined that the first and second queries are substantially similar queries, such queries can be correlated in a query database that is accessible by a search engine. Therefore, if a user submits the first query to the search engine, the search engine will have knowledge that the second query is substantially similar to the first query. The search engine may then use at least a portion of the second query to provide search results to a user in a manner that is transparent to the user. For instance, the search engine can combine search results for both the first query and the second query and provide them to the user. In another example, the search engine upon receiving the first query may solely use the second query to provide search results to the user.

Other aspects will be appreciated upon reading and understanding the attached figures and description.

DETAILED DESCRIPTION

Figure 1:
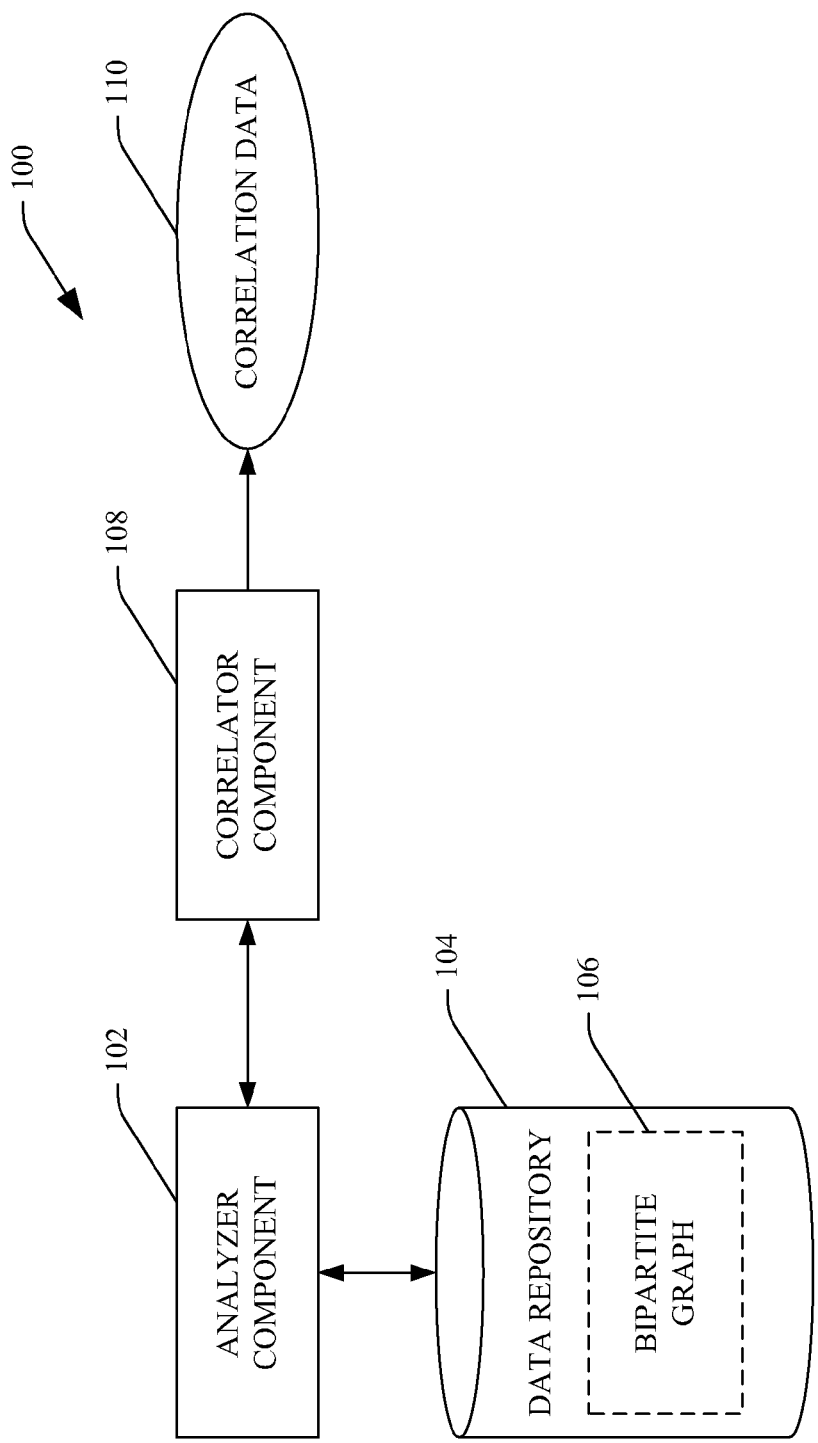
FIG. 1 is a functional block diagram of an example system that facilitates correlating two queries if it is determined that the queries are substantially similar queries.

Various technologies pertaining to determining whether two queries are substantially similar queries will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates determining whether a first query and second query are substantially similar queries is illustrated. The system 100 can further facilitate correlating the first query and the second query if such queries are found to be substantially similar queries. As used herein, the term "substantially similar queries" can refer to queries that are directed to a substantially similar information need of a user as evidenced by relationships between queries and URLs found in query logs. For example, the queries "auto insurance" and "car insurance" may be found to be substantially similar queries, as these queries may be directed at substantially similar information as evidenced by selection of similar URLs when such queries are proffered to a search engine.

The system 100 includes an analyzer component 102 that can analyze queries submitted by users and corresponding URLs selected by users. For instance, the queries submitted by users can include a first query and a second query and the analyzer component can determine that the first query and the second query are substantially similar queries. Various mechanisms for determining that the first query is substantially similar to the second query are described below.

The system 100 can additionally include a data repository 104 that comprises a bipartite graph 106. As will be described in greater detail below, the bipartite graph 106 can include two sets of nodes: 1) a first set of nodes that represent queries; and 2) a second set of nodes that represents URLs selected by one or more users that submitted the queries represented by the first set of nodes in the bipartite graph 106. A node in the first set of nodes can be coupled to a node in the second set of nodes by a weighted edge, wherein a weight of the edge is based at least in part upon a number of selections of the URL represented by the node in the second set of nodes when the query represented by the node in the first set of nodes was provided by a user. The analyzer component 102 can analyze relationships between queries and URLs selected when the queries were issued as represented in the bipartite graph 106 and, based at least in part upon such analysis, can determine whether two queries (e.g., a first query and a second query) are substantially similar queries.

The system 100 can further include a correlator component 108 that, responsive to the analyzer component 102 determining that the first query and the second query are substantially similar queries, can generate correlation data 110 that indicates that the first query and the second query are substantially similar queries. For instance, the correlation data 110 can cause the first query and the second query to be correlated in a table. In another example, the correlation data 110 may be pointer data that causes the first query to point to the second query. Other correlation data is contemplated and intended to fall under the scope of the hereto appended claims.

With more detail pertaining to the bipartite graph 106, the bipartite graph 106 can be a graph G=(V,E), where V is the set of nodes (which may also be referred to as vertices) and E is the set of edges (which may also be referred to as arcs or links) in which there exists a partition $V=V_1 \cup V_2$ such that every edge in E connects a node in $V_1$ and a node in $V_2$. Thus, there is no edge between two nodes in the same set of nodes (e.g., no edges between vertices in the same set). As noted above, a weight of an edge can be based at least in part upon a number of user selections of a URL represented by a node in the second set given a query represented by a node in the first set. Thus w: $V_1 \times V_2 \rightarrow \mathbb{R}^+$ can denote a weight function. Given $i \in V_1$ and $j \in V_2$, if there is an edge connecting i and j, then w(i,j) is positive. Otherwise w(i,j)=0.

Given the bipartite graph 106, the analyzer component 102 can form a random walk as follows. The analyzer component 102 can select a first node representative of a first query in the set $V_1$. An edge connected to such node can be chosen with a probability proportional to the weight of the edge. By following this edge, the random walk can arrive at a node representative of a URL in the set $V_2$. Thereafter, an edge connected to the node in the set $V_2$ can be chosen to follow and the random walk can proceed to a node in the set $V_1$. Given $i \in V_1$ and $j \in V_1$, the transition probability can be defined as $$p_{ij} = \sum_{k \in V_2} \frac{w(i,k)}{d_i} \frac{w(k,j)}{d_k}$$

were $d_i = \sum_{k \in V_2} w(i,k)$ and $d_k = \sum_{j \in V_2} w(k,j)$.

Since it is desired to determine whether two queries are substantially similar, the analyzer component 102 can be configured to analyze nodes in the set $V_1$ (nodes that represent queries). Thus, a random walk based on the random walk described above can be introduced by $$p_{ij} = \sum_{k \in V_2} \frac{w(i,k)}{d_i} \frac{w(k,j)}{d_k}.$$

In an example, the analyzer component 102 can determine whether the first query and the second query are substantially similar queries through use of determining hitting time between the first query and the second query during the random walk, commute time with respect to the first query and the second query during the random walk, and a meeting time with respect to the first query and the second query in the random walk. The computation of hitting time, commute time and meeting time in the random walk will be described in greater detail below.

Figure 2:
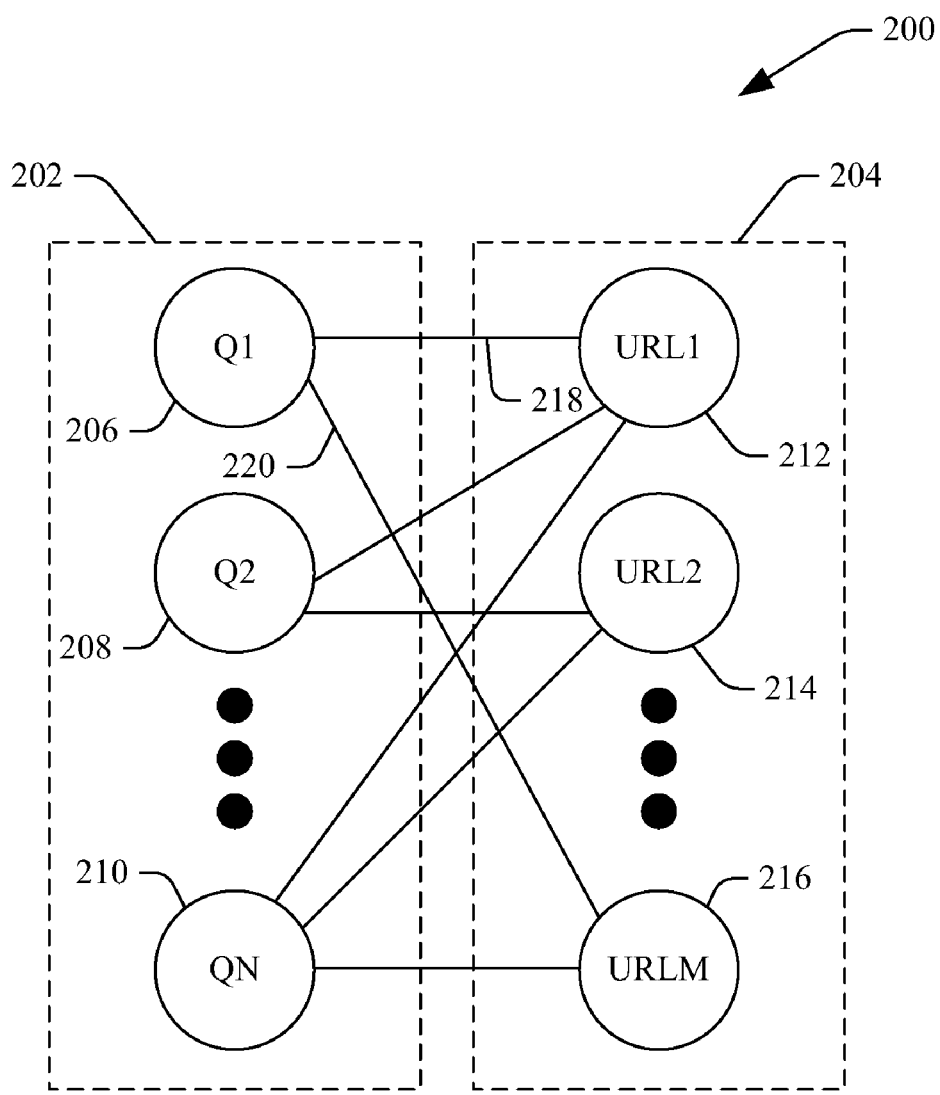
FIG. 2 is a depiction of an example bipartite graph.

Referring now to FIG. 2, an example bipartite graph 200 is illustrated. The graph 200 includes a first set of nodes 202 that represent queries submitted by users and a second set of nodes 204 that represent URLs selected by users when the queries represented in the first set of nodes 202 were submitted to a search engine. An edge exists between a node in the first set of nodes 202 and a node in the second set of nodes 204 if a user clicked on a URL represented by the node in the second set of nodes 204 when the user submitted a query represented by the node in the first set of nodes 202.

In an example, the first set of nodes 202 includes a first node 206, a second node 208, and an Nth node 210 that represents a first query, a second query and an Nth query, respectively. A second set of nodes 204 can include a first node 212, a second node 214 and an Mth node 216 to represent a first URL, a second URL and an Mth URL, respectively. As can be discerned from reviewing the example graph 200, an edge 218 couples the node 206 and the node 212. Accordingly, at least one user selected the first URL when the first query was submitted. Additionally, an edge 220 couples the node 206 with the Nth node 216. Therefore, at least one user also selected the Nth URL when the first query was submitted by the at least one user.

As noted above, edges in the bipartite graph 200 can be weighted based at least in part upon a number of user selections of URLs when certain queries were submitted to a search engine. Pursuant to an example, the first query represented by the first node 206 may have been submitted by users one hundred different times. Out of the one hundred submissions of the first query, the first URL represented by the node 212 may have been selected sixty times while the Nth URL represented by the node 216 may have been selected forty times. Accordingly, the edge 218 may be assigned a greater un-normalized weight when compared to an un-normalized weight assigned to the edge 220. As noted above, the analyzer component 102 (FIG. 1) can use a bipartite graph such as the bipartite graph 200 in connection with determining whether a first query is substantially similar to a second query.

Figure 3:
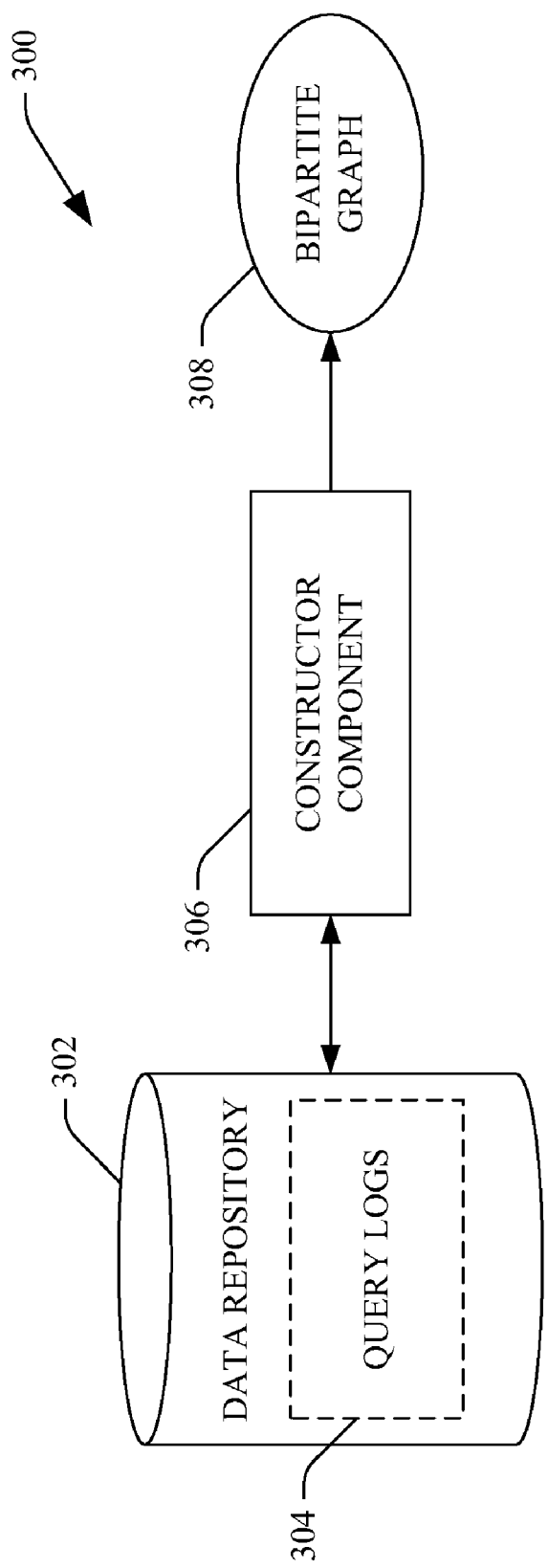
FIG. 3 is a functional block diagram of an example system that facilitates constructing a bipartite graph from query logs.

Turning now to FIG. 3, an example system 300 that facilitates constructing a bipartite graph (such as the bipartite graph 200 of FIG. 2) is illustrated. The system 300 includes a data repository 302 that includes query logs 304. The query logs 304 can include queries submitted by a user to a search engine, search results provided in response to the queries and user selections of URLs returned to the users by the search engine. The system 300 additionally includes a constructor component 306 that can access the query logs 304 and construct a bipartite graph 308 based at least in part upon the query logs 304.

For instance, the constructor component 306 can extract pairs (queries, URLs) and can summarize such pairs such that a bipartite graph G=V,E can be constructed where V=$V_1 \cup V_2$. It can be ascertained that $V_1$ corresponds to queries (Q) in the query logs 304 and $V_2$ corresponds to URLs (U) in the query logs 304. Each edge in the bipartite graph e=(i,j)$\in$E corresponds to a pair ($Q_i$,$U_j$) with positive frequency. The constructor component 306 can weight each edge with a weight $w(i,j)=C(Q_i,U_j)$, which is a number of records where this pair appears. In another example, the constructor component 306 can normalize weights of edges in the bipartite graph 308.

Thus, as described above, a query represented in the bipartite graph 308 can be connected to one or more URLs represented in the bipartite graph 308 upon which users clicked when the query was submitted to a search engine. The weights on the edges represent how many times the users use this query to access such URLs. If the constructor component 306 generates the bipartite graph 308 such that the bipartite graph 308 includes nodes for each query submitted to a search engine as well as each URL submitted in response to a submitted query, the bipartite graph might be quite large, thereby requiring a substantial amount of computing resources when determining whether two queries are substantially similar queries. Accordingly, the constructor component 306 can reduce size of the bipartite graph by culling portions of the bipartite graph 308. For instance, the constructor component 306 can remove edges in the bipartite graph 308 that are weighted below a threshold weight. In another example, the constructor component 306 can select a node that represents a particular query and construct a subgraph by using a depth first search in the bipartite graph 308. The depth first search can stop when the number of nodes that represent queries is larger than a predefined number. The subgraph may then be accessed by the analyzer component 102 to determine which, if any, queries are substantially similar to the queries selected by the constructor component 306.

Figure 4:
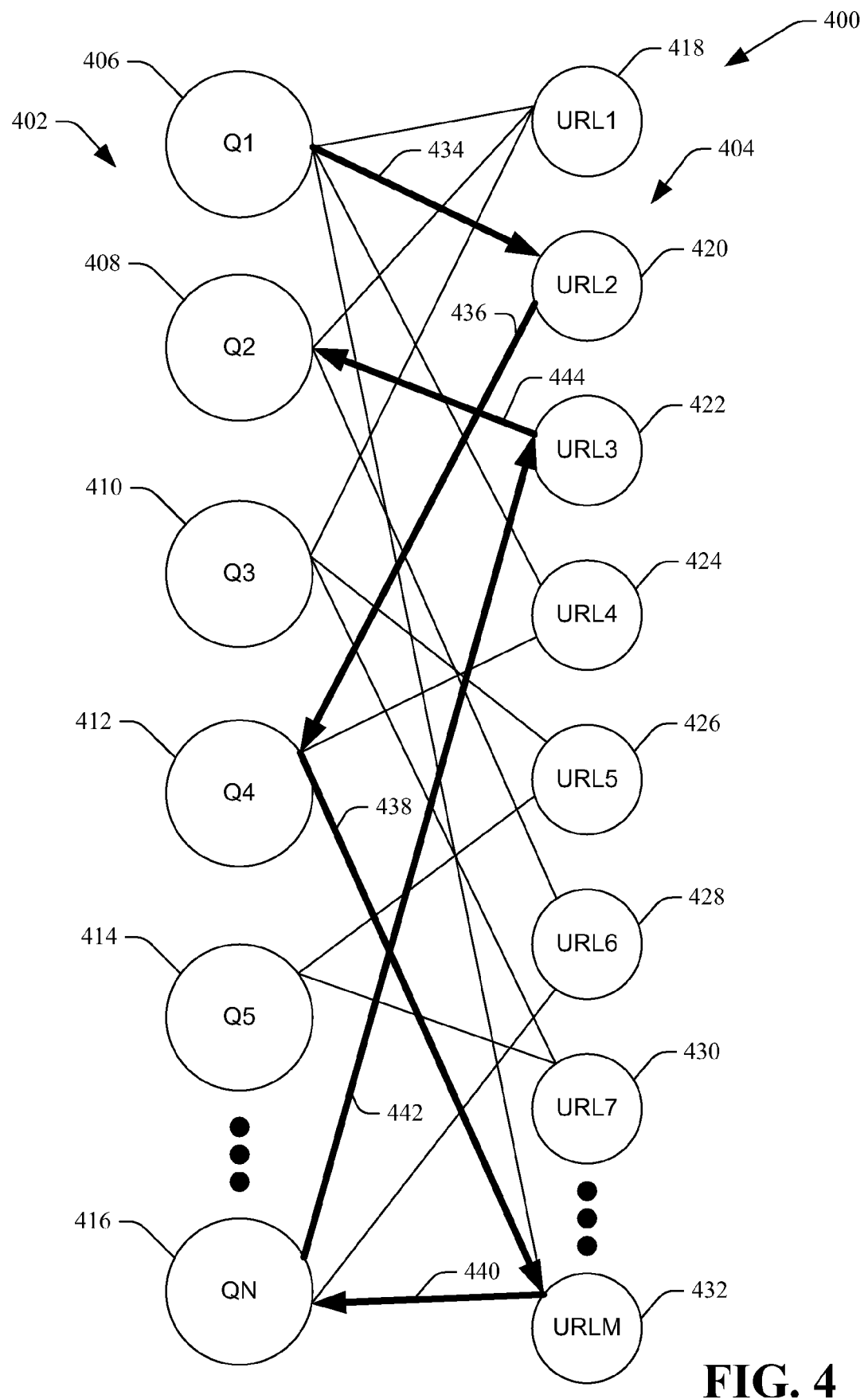
FIG. 4 is a depiction of an example bipartite graph that illustrates computing hitting time between two nodes that represent queries.

With reference to FIG. 4, an example bipartite graph 400 is illustrated. More particularly, FIG. 4 illustrates computations of hitting times between a first node and a second node that represent a first query and a second query, respectively. A determined hitting time can be used by the analyzer component 102 (FIG. 1) to determine whether the first query and the second query are substantially similar queries. A bipartite graph 400 includes a first set of nodes 402 that represent queries and a second set of nodes 404 that represent URLs. The first set of nodes 402 can include nodes 406-416, and the second set of nodes 404 can include nodes 418-432. As described above, an edge exists between a node in the first set of nodes 402 and a node in the second set of nodes 404 if a URL represented by a node in the second set of nodes 418-432 is clicked when a query represented by a node in the first set of nodes 402 is submitted.

In this example, a hitting time between the node 406 that represents a first query and a node 408 that represents a second query is determined, where the hitting time can be indicative of whether the first query and the second query are substantially similar queries. The analyzer component 102 can cause a random walk to be initiated at the node 406. As noted above, an edge connected to the node 406 is chosen with a probability proportional to the weight of the edge. In the example depicted in FIG. 4, an edge 434 is selected that connects the node 406 to the node 420. An edge 436 that connects the node 420 and the node 412 is then selected bringing the random walk to the node 412. The random walk in this example can continue from the node 412 to the node 432 by way of edge 438. The random walk can further continue from the node 432 and along an edge 440 to the node 416 (back to a node in the first set of nodes). The random walk can further continue from the node 416 along an edge 442 to the node 422. Thereafter, the random walk can continue from the node 422 along an edge 444 to the node 408 that represents the second query. Thus, a hitting time between the node 406 that represents the first query and the node 408 that represents the second query can be three steps, wherein a step is a transition from a node in the first set of nodes 402 to another node in the first set of nodes 402. This computed hitting time can be used as a similarity score between the first query and the second query or can be used to generate a similarity score between the first query and the second query. The analyzer component 102 can compare the similarity score to a threshold value and can determine whether or not the first query and second query are substantially similar queries to one another based at least in part upon the comparison.

Computing hitting time can be formally described as follows. The random walk on the bipartite graph 400 can be formed by defining transition probabilities between two queries i and j in the first set of nodes 402 ($V_1$). Such transition probabilities can be defined as:

$$p_{ij} = \sum_{k \in V_2} \frac{w(i,k)}{d_i} \frac{w(k,j)}{d_k}.$$

For all queries except the given queries, the following algorithm can be iterated:

$$h_i(t+1) = \sum_{j \neq i} p_{ij} h_j(t) + 1$$

This algorithm can be iterated for a predefined number of m iterations starting with $h_i(0)=0$. $h_i^*$ can denote the final value of $h_i(t)$. Queries that have an $h_i^*$ value below a threshold value can be labeled as equivalent queries to the given query.

Figure 5:
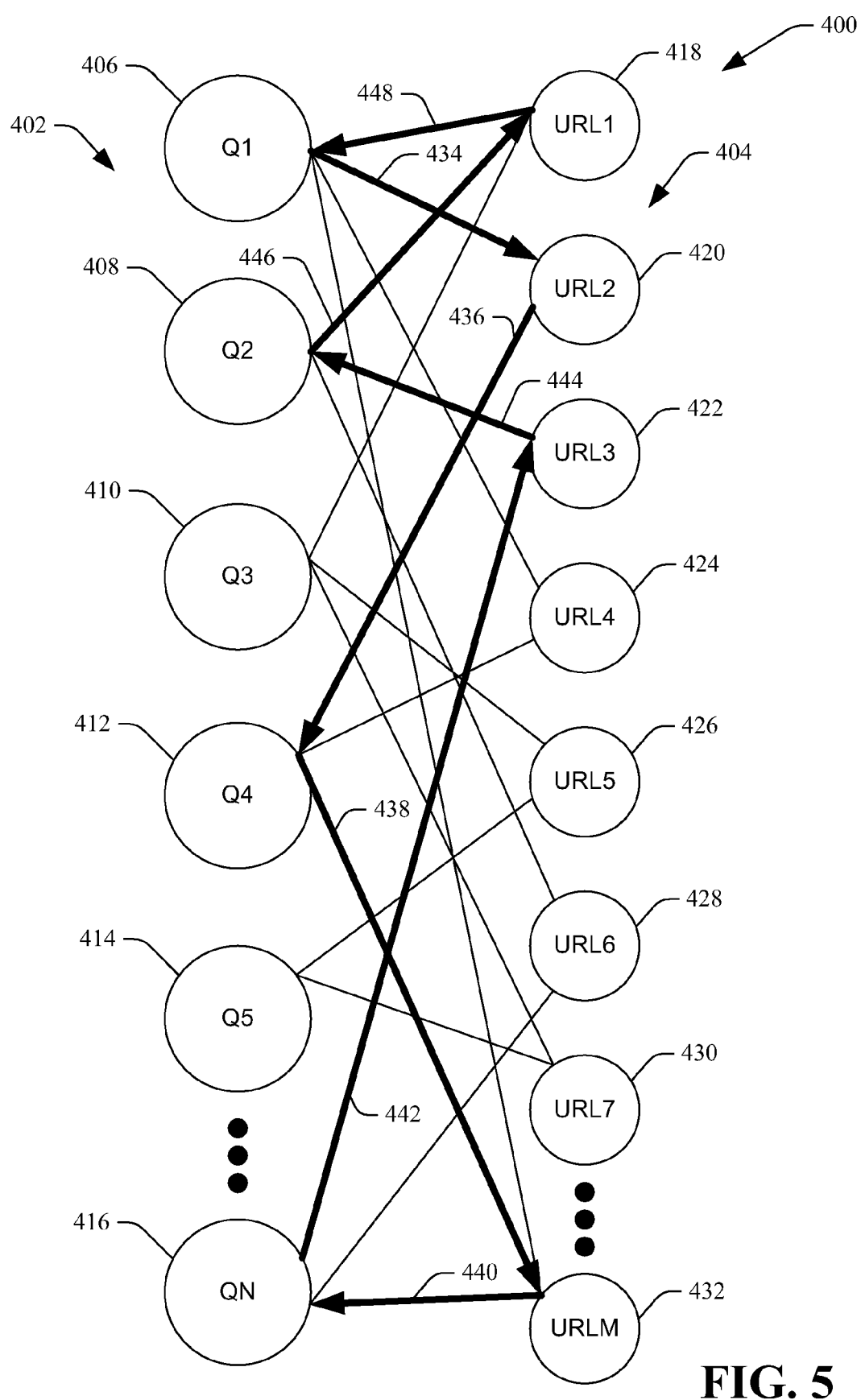
FIG. 5 is a depiction of an example bipartite graph that illustrates determining commute time with respect to two nodes that represent two queries.

Referring now to FIG. 5, an example depiction of computing commute time with respect to two nodes in the first set of nodes 402 of the bipartite graph is illustrated (e.g., and thus computing commute time with respect to two queries). The analyzer component 102 can determine commute time which can be generally described as forming a random walk to initiate at a first node in the first set of nodes, continuing the random walk until it reaches another particular (second) node in the first set of nodes 402 and continuing the random walk until it again returns to the first node in the first set of nodes 402. For instance, continuing with the example in FIG. 4, the random walk can continue from the node 408 along an edge 446 to the node 418 in the second set of nodes 404. Thus, in summary, to determine whether the first query and the second query are substantially similar queries using commute time, the random walk can initiate at the node 406 that represents the first query and can continue until it reaches the node 408 that represents the second query. The random walk may further continue from the node 408 that represents the second query back to the node 406 that represents the first query. In this example, the meeting time between the first query and the second query is four steps. Numerous random walks can be iterated to determine commute time with respect to two nodes that represent two different queries to obtain an average commute time between such nodes. This average can be indicative of whether or not the first query and the second query are substantially similar queries.

Figure 6:
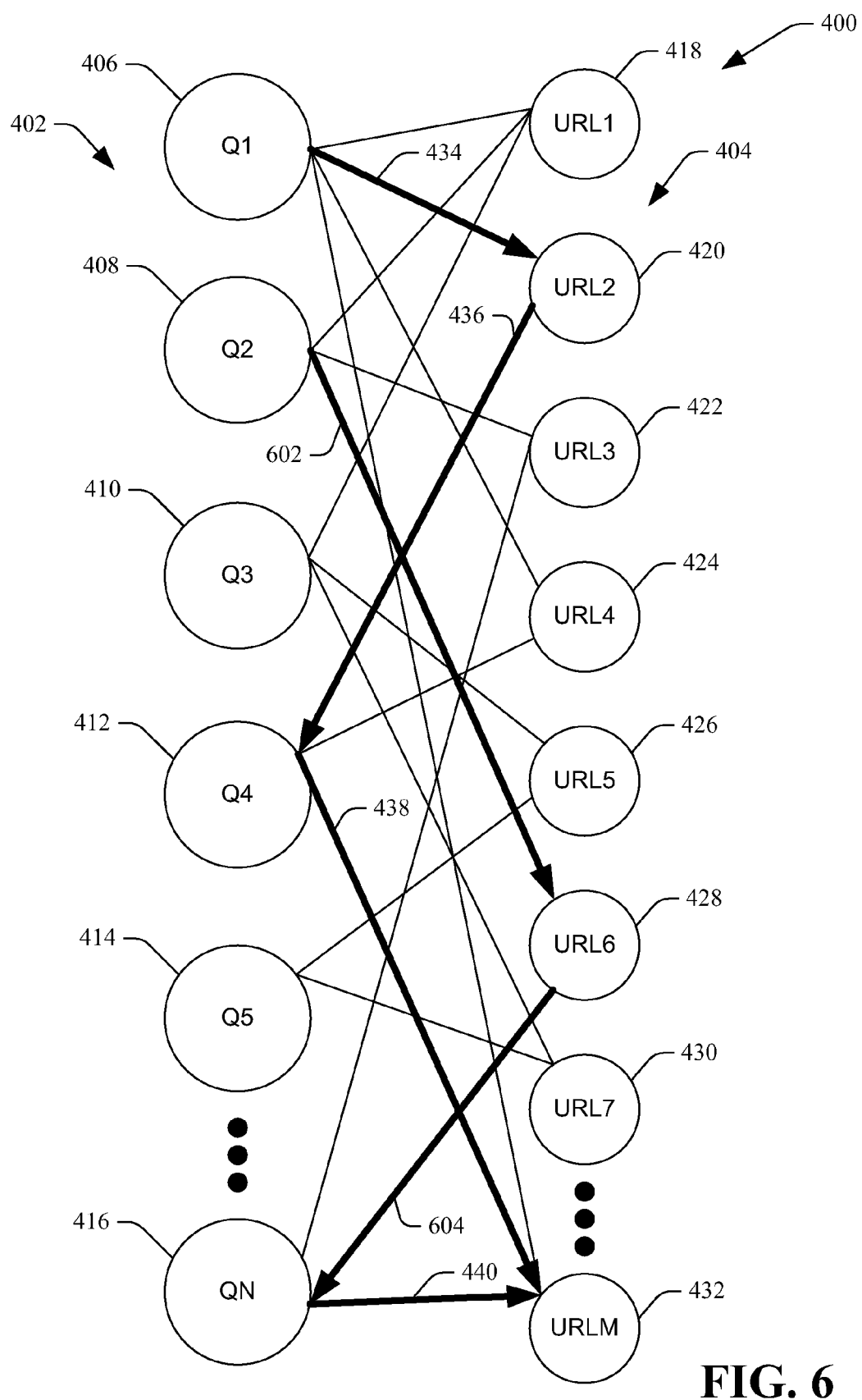
FIG. 6 is a depiction of an example bipartite graph that illustrates determining meeting times between two nodes that represent two queries.

Now referring to FIG. 6, an example determination of meeting time between two nodes in the first set of nodes 402 is illustrated. For instance, it may be desirable to determine whether a first query and a second query are substantially similar queries. As described previously, the node 406 can represent the first query and the node 408 can represent the second query. A first random walk can be started at the node 406 and a second random walk can be started at the node 408. The random walks can continue until they intersect one another. The meeting time can be computed as a total number of steps of both random walks until both random walks intersect, a least number of steps of the random walks when such random walks intersect and/or a greatest number of steps of the random walks when such random walks intersect.

An example depicted in FIG. 6 illustrates determination of meeting time between the node 406 and the node 408, and thus a determination pertaining to whether the first query (represented by the node 406) and the second query (represented by the node 408) are substantially similar. For instance a first random walk can initiate at a node 406 and a second random walk can initiate at the node 408. The first random walk can select the edge 434 and arrive at the node 420 in the second set of nodes 404. The first random walk can continue along the edge 436 to the node 412 in the first set of nodes 402. The first random walk can further continue along the edge 438 to the node 432 in the second set of nodes. The second random walk can initiate at the node 408 and can travel to the node 428 by way of an edge 602. The second random walk can continue from the node 428 to the node 416 by way of an edge 604. The second random walk can continue from the node 416 to the node 432 by way of the edge 440. Thus the first random walk and the second random walk intersect at the node 432.

The meeting time of the random walks can be computed in at least one of three manners. For instance, the meeting time can be a combined number of steps of both random walks until such random walks intersect. In this case, the number of steps would be three. In another example, meeting time can be determined as a greater number of steps of one of the random walks when the random walks intersect. In yet another example, meeting time can be computed as a least number of steps of one of the random walks when the random walks intersect. In the example shown in FIG. 6, the greatest number of steps and the least number of steps are equal (1.5 steps). However, in other instances the number of steps of random walks will be different when such random walks intersect.

The analyzer component 102 can use any of the above three manners to determine meeting time. As noted above, the meeting time computed by the analyzer component 102 can be used as a similarity score or used in connection with generating a similarity score and can be compared against a threshold value. The analyzer component 102 may then determine whether the first query and the second query are substantially similar queries based at least in part upon the comparison of the similarity score to the threshold.

Figure 7:
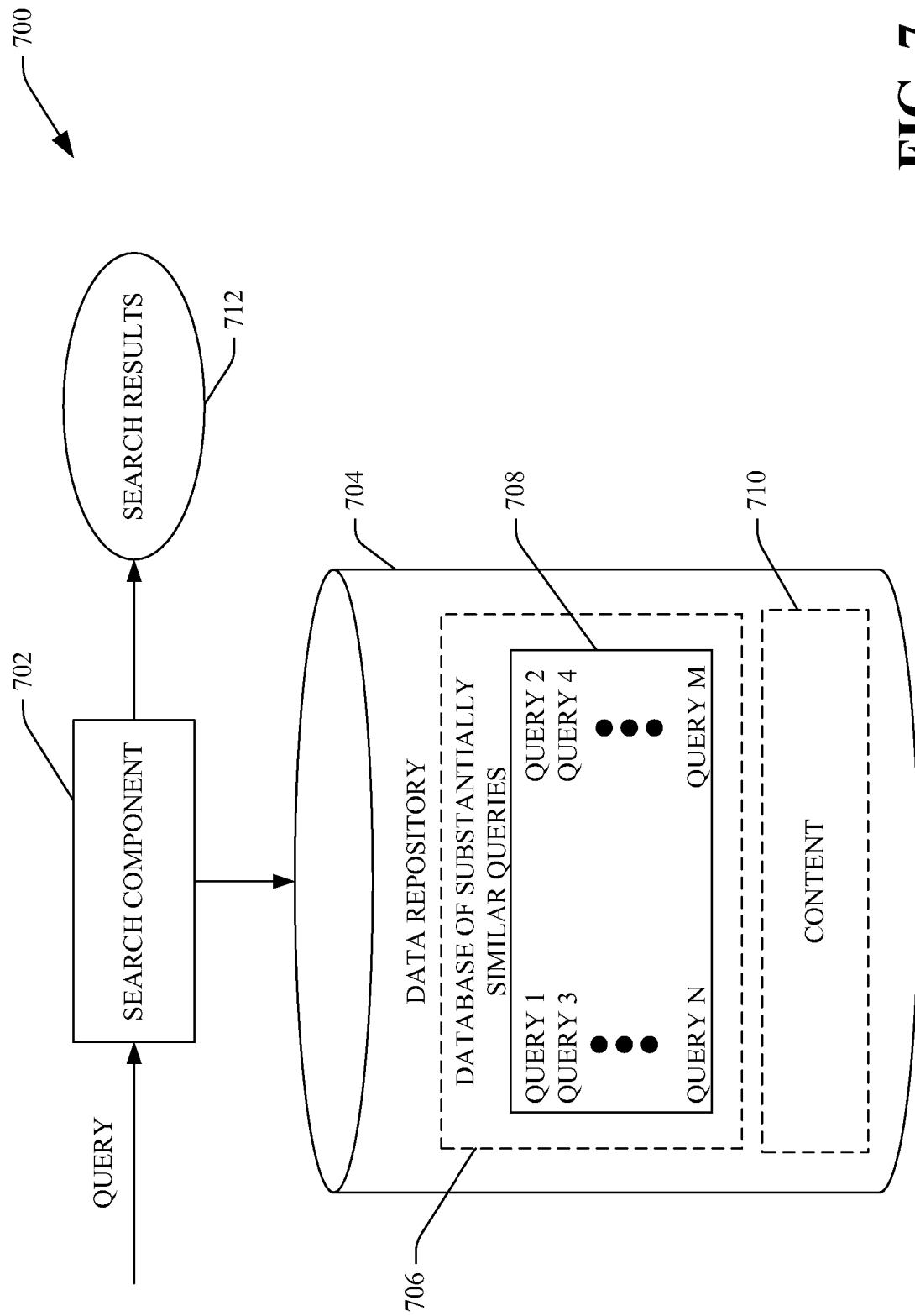
FIG. 7 is a functional block diagram of an example system that facilitates outputting search results based at least in part upon a query that is substantially similar to a received query.

Referring now to FIG. 7, an example system 700 that facilitates executing a search using a query that is substantially similar to a submitted query is illustrated. A system 700 includes a search component 702 that receives a first query from a user. The system 700 can additionally include a data repository 704. The data repository 704 may comprise a database of substantially similar queries 706. Such database 706 can include a lookup table 708 that can be used in connection with determining whether a submitted query has a corresponding substantially similar query. For instance, the lookup table 708 can include an indication that a first query is substantially similar to a second query, that a third query is substantially similar to a fourth query, that an nth query is substantially similar to an Mth query. Lookup table 708 indicates that there is a one-to-one relationship between substantially similar queries. It is to be understood, however, that a query may be substantially similar to a plurality of other different queries.

The data repository 704 additionally includes content 710 that can be searched over by the search component 702 upon receipt of a query. While the content 710 is shown as being in a same data repository as the database of substantially similar queries 706, it is to be understood that the content 710 may be in a different data repository or distributed across numerous data repositories.

In operation, the search component 702 can receive the first query submitted by the user. Responsive to receiving such query, the search component 702 can access the lookup table 708 and the database of substantially similar queries 706 that are included in a data repository 704. The search component 702 can determine if the first query submitted by the user is included in the lookup table 708. If the first query is not included in the lookup table 708, the search component 702 can execute a search using the first query against the content 710 and output search results 712, based at least in part upon such search.

If the first query submitted by the user is included in the lookup table 708, the search component 702 can locate queries that are substantially similar to the query submitted by the user. The search component 702 may then use such substantially similar queries in connection with executing a search over the content 710. For instance, the search component 702 can replace the first submitted query with the query found to be substantially similar to the first query and can execute a search using the substantially similar query. Search component 702 may then output search a result 712 that is based at least in part upon the substantially similar query. In another example, the search component 702 can perform a search over the content 710 using both the first submitted query and one or more substantially similar queries. The search component 702 may then combine search results obtained from executing the submitted query and the one or more substantially similar queries. Thus, the search results 712 can include results pertaining to the submitted query as well as one or more substantially similar queries. In yet another example, the search component 702 can receive the submitted query and can parse the submitted query into a plurality of terms. The search component 702 may then access the lookup table 708 to determine if any of the terms are included as queries in the lookup table 708. If such terms are included as queries in the lookup table 708, one or more terms in the submitted query, for instance, can be replaced by substantially similar terms as defined in the lookup table 708. In another example, the search component 702 can generate additional queries that include the terms that are substantially similar to terms in the submitted query. The search component 702 may then search the contents 710 using multiple queries that include substantially similar terms and the search results 712 can include results pertaining to such different queries.

Still further, while not shown, the search component 702 can provide substantially similar queries to one or more advertisers to determine whether the advertiser would like to bid on the query submitted by the user. For instance, an advertiser may indicate to a search engine that they would like to bid on a query "tv service." The analyzer component 102 can determine that the query "tv service" is substantially similar to the query "television service." If a user submits the query "television service" the search component 702 can access the lookup table 708 and determine that such query is substantially similar to the query "tv service." The search component 702 may then indicate to the advertiser that a query substantially similar to the query upon which they wish to bid has been submitted to the search engine. Such an approach can provide additional revenue for search engines as well as provide more relevant advertisements to users.

Figure 8:
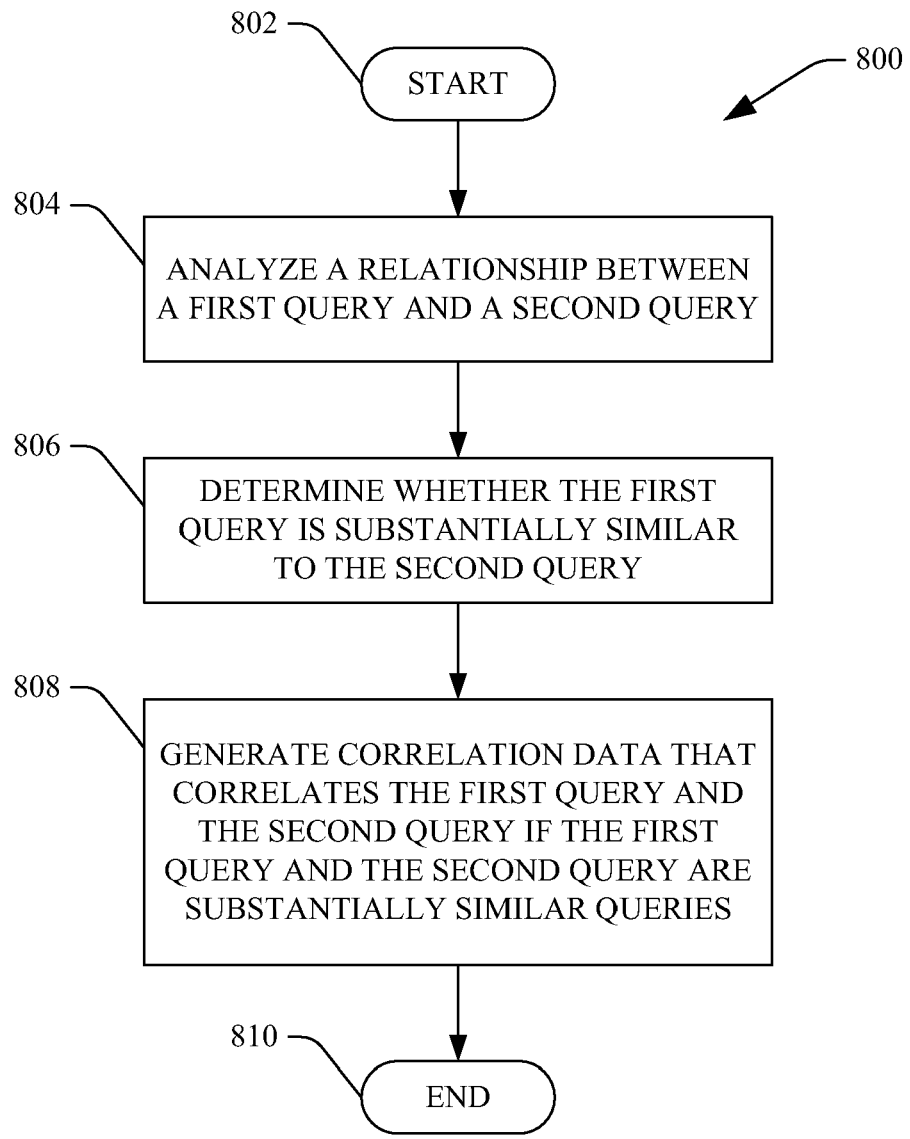
FIG. 8 is flow diagram that illustrates an example methodology for generating correlation data that correlates two queries that are substantially similar queries.
Figure 9:
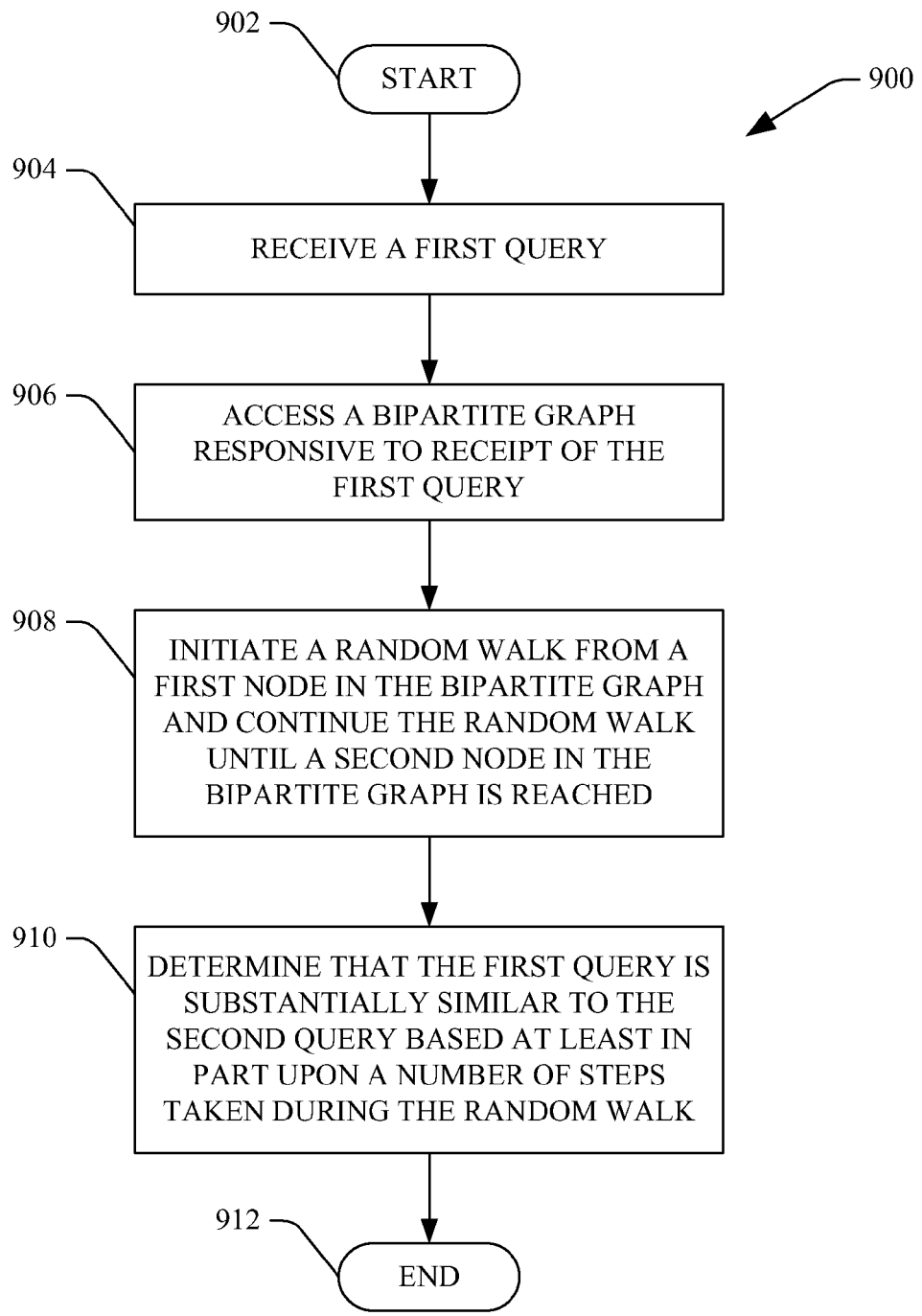
FIG. 9 is a flow diagram that illustrates an example methodology for determining that a first query is substantially similar to a second query.
Figure 10:
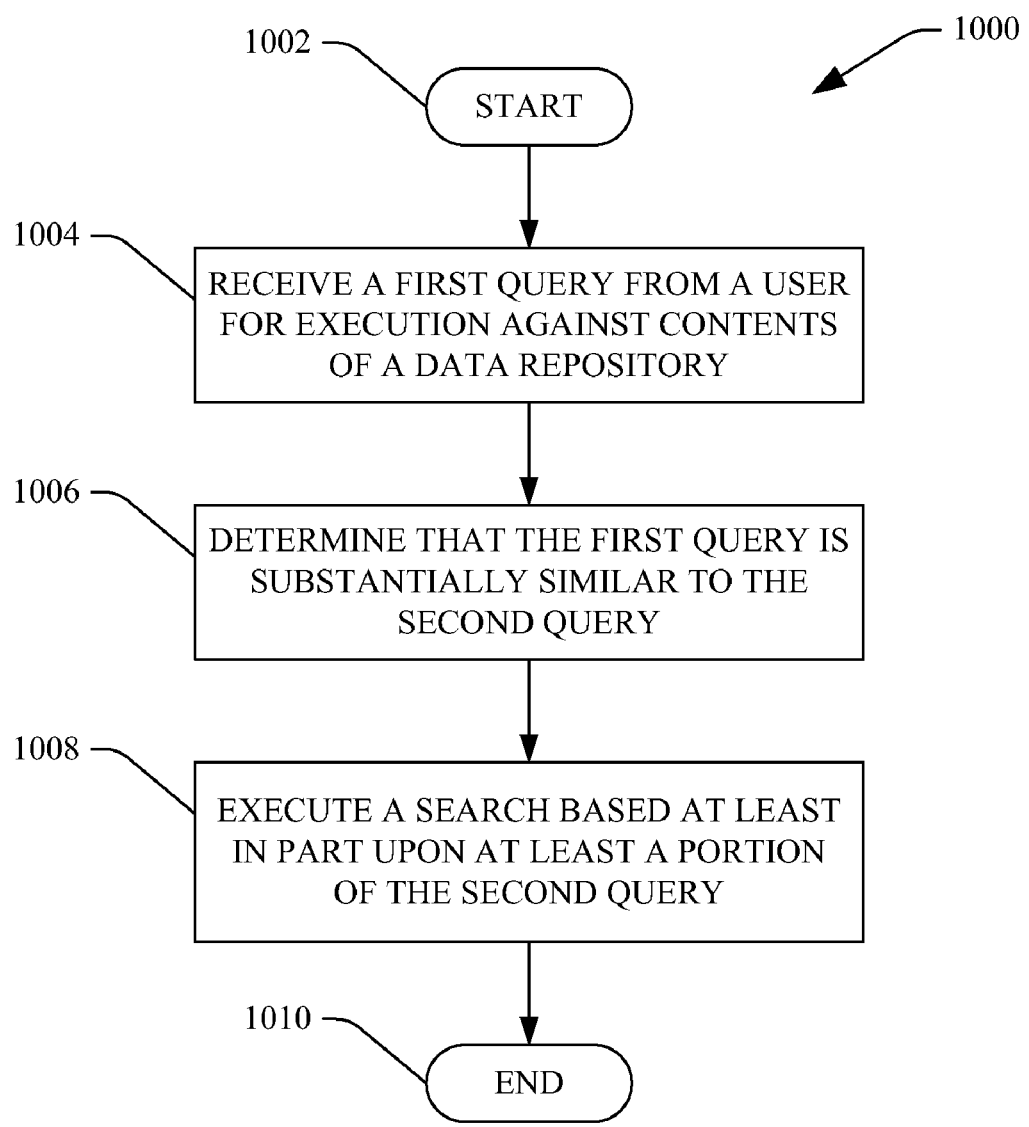
FIG. 10 is a flow diagram that illustrates an example methodology for executing a search based at least in part upon at least a portion of a query that is substantially similar to a query received from a user.

With reference now to FIGS. 8-10, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 8, a methodology 800 that facilitates generating correlation data that indicates that two queries are substantially similar queries is illustrated. The methodology 800 begins at 802, and at 804 a relationship between a first query and a second query is analyzed, where the analysis is based at least in part upon search results previously selected by users, wherein the search results previously selected by the users were presented to the users in response to submission of the first query and/or the second query to a search engine. As noted above, the analysis can include analyzing a bipartite graph that includes a first set of nodes that represent queries, a second set of nodes that represent URLs, and edges between nodes in the first set of nodes and nodes in the second set of nodes that indicate which URLs were selected when certain queries were submitted to a search engine.

At 806, a determination is made regarding whether the first query is substantially similar to the second query. For instance, the determination can be made based at least in part upon the analysis of act 804. Furthermore, the determination can be made based at least in part upon a computed hitting time, commute time and/or meeting time between nodes that represent the first query and second query in a bipartite graph.

At 808, correlation data is generated that correlates the first query and second query if the first query and second query are substantially similar queries. For instance, the correlation data can include causing a first query and a second query to be correlated to one another in a lookup table of queries. The correlation data may additionally include a pointer from the first query to a second query and/or a pointer from the second query to the first query. The methodology 800 ends at 810.

Referring now to FIG. 9, an example methodology 900 for determining that a first query is substantially similar to a second query is illustrated. The methodology 900 starts at 902, and at 904 a first query is received. For instance, the first query can be received from a data repository, can be received from a search engine, etc. At 906, a bipartite graph is accessed in response to receipt of the first query. The bipartite graph can be a computer implemented bipartite graph and, as described above, can include a first set of nodes that represent queries and a second set of nodes that represent URLs. The first set of nodes can include a first node that is representative of the first query and a second node that is representative of a second query, wherein it is desirable to determine whether the first query and the second query are substantially similar queries. The bipartite graph can additionally include at least a first weighted edge that couples the first node to at least one node in the second set of nodes in the bipartite graph. The bipartite graph can also include at least a second weighted edge that couples at least one node in the second set of nodes to the second node that represents the second query.

At 908, a random walk is initiated from the first node in the bipartite graph. The random walk continues until the second node in the bipartite graph is reached. Edges selected during the random walk are selected pseudo randomly while considering weights of the edges coupled to the nodes.

At 910, a determination is made that the first query is substantially similar to the second query based at least in part upon a number of steps taken during the random walk. For example, as described above, one or more of hitting time, commute time and/or meeting time can be used in connection with determining that the first query is substantially similar to the second query. After determining that the first query is substantially similar to the second query, the first query and second query can be correlated as being substantially similar in a computer readable medium. For instance, the first query can be correlated to a second query in a lookup table that is stored in a computer readable medium.

It is thus to be understood that a random walk can be initiated in the bipartite graph from the first node that is representative of the first query, and a plurality of queries determined to be substantially similar to the first query can be output (e.g., through use of hitting time or commute time algorithms). Thus, the second query need not be identified a priori when determining that the second query is substantially similar to the first query. The methodology 900 completes at 912.

With reference now to FIG. 10, an example methodology 1000 for executing a search through use of substantially similar queries is illustrated. The methodology 1000 starts at 1002, and at 1004, a first query is received from a user for execution against contents of a data repository. For instance, a first query can be received at a search engine that is configured to search contents of the World Wide Web using the received query.

At 1006, a determination is made that the first query is substantially similar to a second query. This determination can be made by accessing a lookup table with the first query and ascertaining that the second query is correlated with the first query as a substantially similar query. In another example, the determination that the first query is substantially similar to the second query can be accomplished online such that when the first query is received, query logs are accessed, a bipartite graph is constructed or modified, and a random walk is undertaken in at least a subgraph that includes the first query. Such a manner of determining that the first query is substantially similar to the second query is described above.

At 1008, a search is executed based at least in part upon at least a portion of the second query. For instance, the first query can be entirely replaced by the second query and a search can be undertaken through use of the second query. In another example, both the first query and the second query can be used to obtain search results, and search results pertaining to both queries can be provided to a user. In still another example, one or more terms in the second query can be placed in the first query such that the first query is modified to include a portion of the second query. The modified first query can be used by a search engine to execute a search against contents of a data repository. Search results can be returned to a user such that they are provided on a display screen and presented in a ranked manner. The methodology 1000 completes at 1010.

Figure 11:
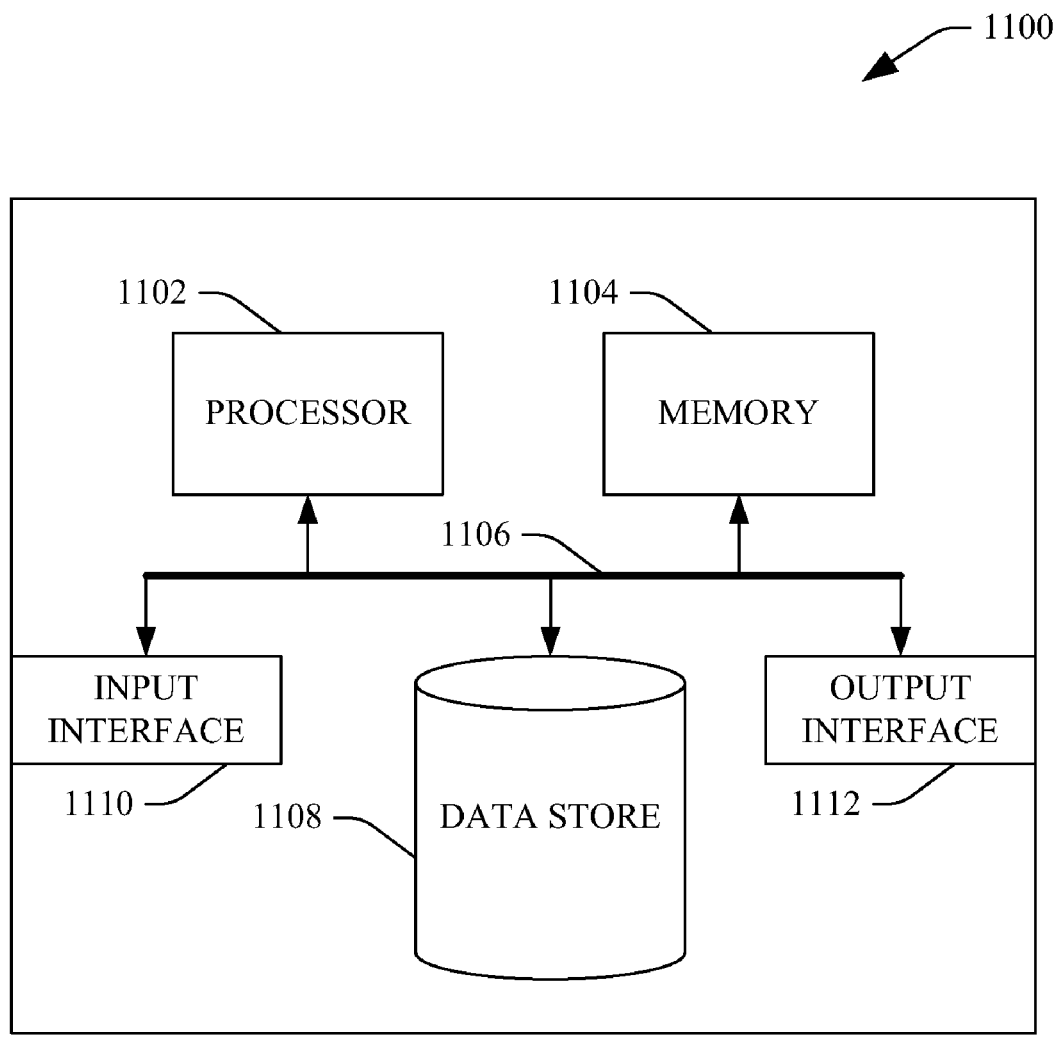
FIG. 11 is an example computing system.

Now referring to FIG. 11, a high-level illustration of an example computing device 1100 that can be used in accordance with the systems and methodologies disclosed herein is illustrated. For instance, the computing device 1100 may be used in a system that supports determining whether a first query is substantially similar to a second query. In another example, at least a portion of the computing device 1100 may be used in a system that supports performing a search using a query that is substantially similar to a received query. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store a bipartite graph, one or more algorithms for performing a random walk over the bipartite graph, one or more algorithms for determining hitting time, meeting time and/or commute time with respect to at least two queries represented by nodes in the bipartite graph, etc.

The computing device 1100 additionally includes a data store 1108 that is accessible by the processor 1102 by way of the system bus 1106. The data store 1108 may include executable instructions, a bipartite graph, a subgraph, algorithms for performing a random walk over a bipartite graph, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:

analyzing a relationship between a first query and a second query based at least in part upon search results previously selected by users, wherein the search results previously selected by the users were presented to the users in response to submission of the first query and/or the second query to a search engine, wherein analyzing the relationship between the first query and the second query comprises:
  accessing a data repository that comprises a computer-implemented bipartite graph that includes a first set of nodes and a second set of nodes, wherein the first set of nodes represents queries and the second set of nodes represents URLs, wherein the first set of nodes includes a first node that is representative of the first query and a second node that is representative of the second query, and wherein the graph further comprises edges that are weighted to indicate relationships between queries and URLs;
  initiating a random walk at the first node; and
  determining a number of steps in the random walk until the second node is reached in the random walk, wherein a step is from a node in the first set of nodes to another node in the first set of nodes;
  determining whether the first query is substantially similar to the second query based at least in part upon the number of steps in the random walk until the second node is reached in the random walk; and
  generating correlation data that correlates the first query and the second query if the first query and second query are determined to be substantially similar.

2. The method of claim 1, wherein determining whether the first query is substantially similar to the second query comprises:
  computing a similarity score between the first query and the second query based at least in part upon the number of steps in the random walk until the second node is reached in the random walk;
  comparing the similarity score with a threshold score; and
  indicating that the first query and the second query are substantially similar based at least in part upon the comparing of the similarity score with the threshold score.

3. The method of claim 1, wherein analyzing the relationship between the first query and second query further comprises:
  subsequent to determining the number of steps in the random walk until the second node is reached in the random walk, continuing the random walk until the first node is reached; and
  determining a number of steps in the random walk from the first node and back to the first node.

4. The method of claim 1, wherein the edges are weighted based at least in part upon a number of user selections of a URL when a particular query is submitted to a search engine.

5. The method of claim 4, wherein an edge selected during the random walk is based at least in part upon a weight of the edge in the bipartite graph.

6. The method of claim 1, wherein analyzing the relationship between the first query and the second query further comprises:
  initiating a second random walk at the second node; and
  determining a number of steps in the first random walk and the second random walk until the first random walk and the second random walk intersect in the bipartite graph.

7. The method of claim 1, further comprising:
  receiving the first query from a user for execution against contents of a data repository;
  determining that the first query is substantially similar to the second query; and
  outputting a search result to the user that is based at least in part upon the second query.

8. The method of claim 7, further comprising:
  outputting search results to the user based at least in part upon the first query and the second query.

9. The method of claim 7, further comprising:
  automatically replacing a first term in the first query with a second term in the second query to create a modified first query; and
  outputting search results based at least in part upon the modified first query.

10. The method of claim 7, further comprising:
  outputting an advertisement based at least in part upon the second query.

11. The method of claim 1, further comprising:
  accessing a database that includes query logs; and
  constructing the bipartite graph that includes queries and URLs selected by users corresponding to the queries.

12. The method of claim 1, wherein the first query is initially selected and determinations are made regarding whether the first query is substantially similar to a plurality of other queries.

13. A system, comprising:
  a processor;
  a data repository that includes a computer-implemented bipartite graph, wherein the bipartite graph includes a first set of nodes that represent queries, a second set of nodes that represent URLs, and weighted edges that represent relationships between queries and URLs, wherein the edges are weighted based at least in part upon a number of user selections of URLs given particular queries, wherein the first set of nodes includes a first node that represents a first query and a second node that represents a second query;
  a memory that comprises a plurality of components that are executed by the processor, the plurality of components comprising:
    an analyzer component that analyzes queries submitted by users and corresponding URLs selected by the users, wherein the queries include the first query and the second query, and wherein the analyzer component initiates a random walk at the first node in the bi-partite graph and counts a number of steps taken during the random walk until the random walk reaches the second node in the bipartite graph, the analyzer component determining that the first query and the second query are substantially similar based at least in part upon the number of steps taken during the random walk; and
    a correlator component that, responsive to the analyzer component determining that the first query and the second query are substantially similar, generates correlation data that indicates that the first and second queries are substantially similar.

14. The system of claim 13, wherein the analyzer component computes one of hitting time between the first node and the second node, commute time with respect to the first node and the second node, or meeting time between the first node and the second node.

15. The system of claim 13, the plurality of components further comprising a constructor component that access query logs and constructs the bipartite graph based at least in part upon the query logs.

16. The system of claim 13, wherein the correlator component causes the first query and the second query to be correlated in a database of substantially similar queries.

17. The system of claim 16, the plurality of components further comprising:
   a search component that receives the first query from a user, accesses the database of substantially similar queries and determines that the second query is a substantially similar query to the first query, and automatically executes a search using the second query.

18. A computer-readable data storage device comprising instructions that, when executed by a processor, cause the processor to perform acts comprising:
   receiving a first query;
   accessing a computer-implemented bipartite graph, wherein the bipartite graph includes a first set of nodes that represent queries and a second set of nodes that represent URLs, wherein the first set of nodes includes a first node that is representative of the first query and wherein the bipartite graph further includes a first weighted edge that couples the first node to at least one node in the second set of nodes and includes weighted edges that couple nodes in the first set of nodes with nodes in the second set of nodes;
   initiating a random walk from the first node, wherein edges in the random walk are selected pseudo-randomly while considering weights of the edges; and
   outputting a second query that is determined to be substantially similar to the first query based at least in part upon a number of steps taken during the random walk between the first node and a second node that represents the second query.

19. The computer-readable data storage device of claim 18, wherein the acts further comprise:
   continuing the random walk from the second node until the random walk returns to the first node;
   counting a total number of steps taken during the random walk from the first node to the second node and back to the first node; and
   outputting the second query based at least in part upon the total number of steps taken during the random walk from the first node to the second node and back to the first node.

20. The computer-readable data storage device of claim 18, wherein the acts further comprise:
   subsequent to outputting the second query, replacing a first term in the first query with a second term in the second query to generate a modified query; and
   automatically executing a web search utilizing the modified query.

* * * * *